US012717482B2

(12) United States Patent
Ji

(10) Patent No.: US 12,717,482 B2
(45) Date of Patent: Aug. 25, 2026

(54) STORAGE SYSTEM USING COMPUTE EXPRESS LINK (CXL) INTERFACE

(71) Applicant: SAMSUNG ELECTRONICS CO., LTD., Suwon-si (KR)

(72) Inventor: Soo Young Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/962,185

(22) Filed: Nov. 27, 2024

(65) Prior Publication Data

US 2025/0335094 A1 Oct. 30, 2025

(30) Foreign Application Priority Data

Apr. 25, 2024 (KR) ........................ 10-2024-0055211

(51) Int. Cl.
*G06F 3/06* (2006.01)

(52) U.S. Cl.
CPC ............ *G06F 3/061* (2013.01); *G06F 3/0655* (2013.01); *G06F 3/0673* (2013.01)

(58) Field of Classification Search
CPC ...... G06F 3/061; G06F 3/0655; G06F 3/0673; G06F 12/0246; G06F 13/4221; G06F 16/168; G06F 12/0868
See application file for complete search history.

(56) References Cited

U.S. PATENT DOCUMENTS

2021/0109657 A1 4/2021 Amidi et al.
2021/0117340 A1 4/2021 Trikalinou et al.
2021/0240655 A1* 8/2021 Das Sharma ....... G06F 13/4221
2022/0197556 A1 6/2022 Bert et al.
2022/0350759 A1 11/2022 Steinmetz et al.
2024/0012684 A1* 1/2024 Jung ..................... G06F 9/5016
2025/0224977 A1* 7/2025 Luo ....................... G06F 16/176
2025/0225084 A1* 7/2025 Baronne ............. G06F 13/4221
2025/0291507 A1* 9/2025 Caraccio ............... G06F 3/0673
2025/0306766 A1* 10/2025 Orlando ................ G06F 3/0653

FOREIGN PATENT DOCUMENTS

EP 4202628 6/2023
EP 4283457 A2 11/2023
KR 10-2023-0100522 7/2023
KR 10-2560109 7/2023

OTHER PUBLICATIONS

An Introduction to the Compute Express LinkTM (CXLTM) Interconnect (Year: 2023).*
Extended European Search Report dated May 9, 2025 issued in corresponding European Patent Application No. 24219007.2.

* cited by examiner

*Primary Examiner* — Tasnima Matin
(74) *Attorney, Agent, or Firm* — MORGAN, LEWIS & BOCKIUS LLP

(57) ABSTRACT

A storage system includes a host and a storage device. The storage device includes a device memory. The host and the storage device communicate with one another through a CXL interface. The storage device receives an access request including a key value from the host, reads stream data from the device memory based on the key value and transmits the read stream data to the host.

20 Claims, 12 Drawing Sheets

STORAGE SYSTEM USING COMPUTE EXPRESS LINK (CXL) INTERFACE

CROSS-REFERENCE TO RELATED APPLICATION

This patent application claims priority under 35 U.S.C. 119 to Korean Patent Application No. 10-2024-0055211 filed on Apr. 25, 2024 in the Korean Intellectual Property Office, the disclosure of which is incorporated by reference in its entirety herein.

1. Technical Field

The present disclosure is directed to a storage system including a CXL interface.

2. Discussion of Related Art

A host device may provide commands to a plurality of devices for performing one or more access operations. For example, the host device may perform an access operation on data stored in a storage device.

With the development of techniques such as artificial intelligence (AI), big data, and edge computing, there is a growing demand for quickly processing larger amounts of data locally in the device. However, high-bandwidth applications that perform complex computations require faster data processing and more efficient memory access.

A CXL interface is an open industry standard for communication based on Peripheral Component Interconnect Express (PCIe) 5.0., which is designed to connect processors, memory, and accelerators with high bandwidth and low latency. The CXL interface may facilitate movement of data in a continuous flow (e.g., stream data) between different devices.

SUMMARY

At least one embodiment of the present disclosure provides a storage device having increased stream transfer operation performance by facilitating address translation for stream data.

A storage system according to an embodiment of the disclosure may significantly reduce a bottleneck phenomenon of an input/output (I/O) channel between the storage device and a host, while storing stream data in the order of byte addresses, using the CXL interface.

According to an embodiment of the present disclosure, there is provided a storage system including a host and a storage device. The storage device includes a device memory. The host and the storage device communicate with one another through a CXL interface. The storage device receives an access request including a key value from the host, the storage device reads stream data from the device memory based on the key value and transmits the read stream data to the host.

According to an embodiment of the present disclosure, there is provided a storage system including a storage device and a host. The storage device includes a CXL interface and a device memory that stores stream data. The host is connected to the CXL interface and is configured to generate an access request including a data identifier. The storage device reads the stream data from the device memory at a logic block address corresponding to the data identifier, and transmits the stream data to the host.

According to an embodiment of the present disclosure, there is provided a storage system including a host that generates stream data, and a storage device. The storage device is connected to the host through a CXL interface and includes a device memory. The storage device synchronizes the host with a data identifier, the storage device receives the stream data and a byte address from the host, the storage device stores the received stream data in the device memory, and the storage device sends a logic block address of the device memory and the data identifier to the host.

DETAILED DESCRIPTION

Hereinafter, a storage system including a CXL interface according to some embodiments of the present disclosure will be described with reference to FIGS. 1 to 12.

Figure 1:
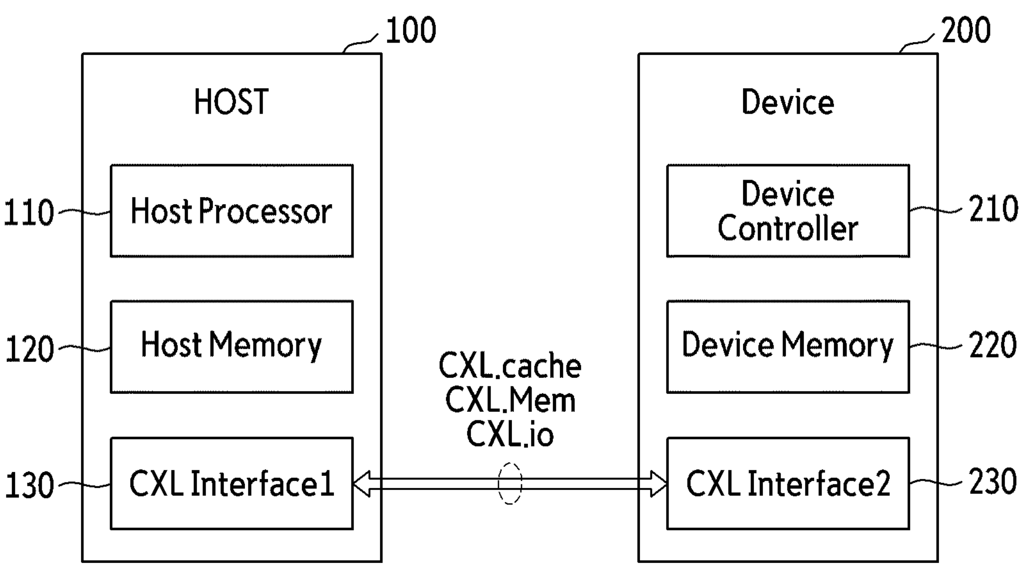
FIG. 1 is a block diagram illustrating a storage system according to an embodiment.

FIG. 1 is a block diagram explaining a storage system according to an embodiment.

Referring to FIG. 1, the storage system includes a host device 100 and at least one storage device 200. The storage device 200 may be connected to the host device 100 through a Compute Express Link (CXL) interface. The storage device 200 may include a plurality of non-volatile memory devices.

The host device 100 may include a host processor 110, a host memory 120, and a host interface 130 (e.g., an interface circuit). The host processor 110 may be, for example, a general purpose processor such as a central processing unit (CPU) core of the host device 100. The host memory 120 may include, for example, a random access memory (RAM) (e.g., dynamic random-access memory (DRAM)), a read-only memory (ROM), or the like. The host interface 130 may communicate with the storage device 200.

The storage device 200 may include a device controller 210 (e.g., a controller circuit), a device memory 220, and a device interface 230 (e.g., an interface circuit). The device controller 210 may be a storage controller. The storage controller may be a driving processor that processes an access to a non-volatile memory device. The device memory 220 may be an operating memory, which may include, for example, a random access memory (RAM) (e.g., a dynamic random-access memory (DRAM)), a read-only memory (ROM), or the like. The device interface 230 may communicate with the host device 100. For example, the host interface 130 may communicate with the device interface 230 to enable the host device 100 and the storage device 200 to communicate with each other.

The communication between the host device 100 and the storage device 200 may be performed, using a wired and/or wireless communication medium, an interface, a network, an interconnect, a protocol, or the like. These may include Peripheral Component Interconnect Express (PCIe), Non-volatile Memory Express (NVMe), NVMe over Fabric (NVMe-oF), Compute Express Link (CXL), and/or coherent protocol such as CXL.mem, CXL.cache and CXL.IO, Gen-Z, Open Coherent Accelerator Processor Interface (OpenCAPI), Cache Coherent Interconnect for Accelerators (CCIX), or the like, Advanced extensible Interface (AXI), Direct Memory Access (DMA), Remote DMA (RDMA), RDMA over Converged Ethernet (ROCE), Advanced Message Queuing Protocol (AMQP), Ethernet, Transmission Control Protocol/Internet Protocol (TCP/IP), FibreChannel, InfiniBand, Serial ATA (SATA), Small Computer Systems Interface (SCSI), Serial Attached SCSI (SAS), iWARP, any generation of wireless networks including 2G, 3G, 4G, 5G, 6G, etc., any generation of WiFi, Bluetooth, near-field communication (NFC), etc., or any combination thereof.

The host interface 130 and the device interface 230 may be implemented as a CXL cache coherent interconnect (hereafter, CXL interface) for purposes of explaining principles of the present invention, although they are not limited to specific implementation details. The CXL interface enables cache coherency and memory semantics for multi-dimensional processing and memory systems for optimized performance in evolving usage models. In addition, the CXL interface may support cache line segmentation, i.e., 64-byte memory access, and may support switching which enables fan-out to many devices useful for memory expansion. The CXL interface may be used for heterogeneous computing, for example, in scalar, vector, and buffered memory systems. The CXL interface may be used to provide a cache coherent interconnect by utilizing a channel, a retimer, a PHY layer of the system, logical aspects of the interface, and a protocol from PCIe 5.0. The CXL interface may support three multiplexed sub-protocols that operate simultaneously on a single link, which may be referred to as a CXL.io protocol, a CXL.cache protocol, and a CXL.mem protocol, respectively.

The host interface 130 may be connected to the device interface 230 by at least one protocol, for example, a protocol among the CXL.mem protocol, the CXL.cache protocol, and the CXL.io protocol.

Figure 2:
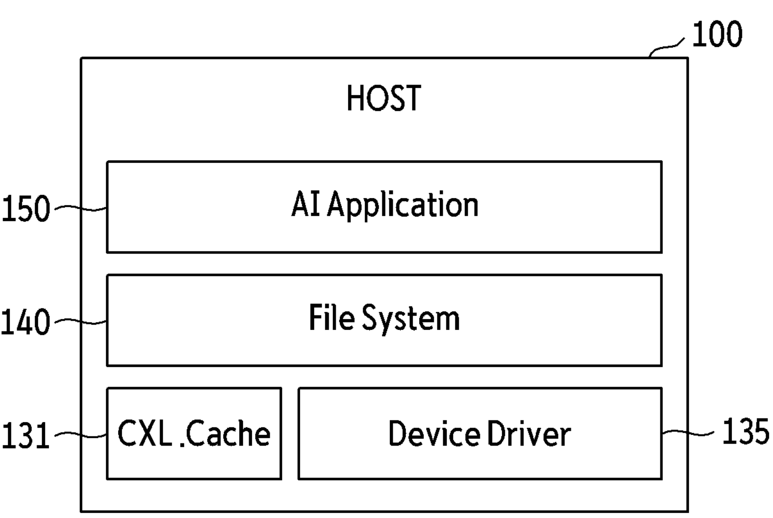
FIG. 2 is an exemplary diagram of a host device according to an embodiment.
Figure 3:
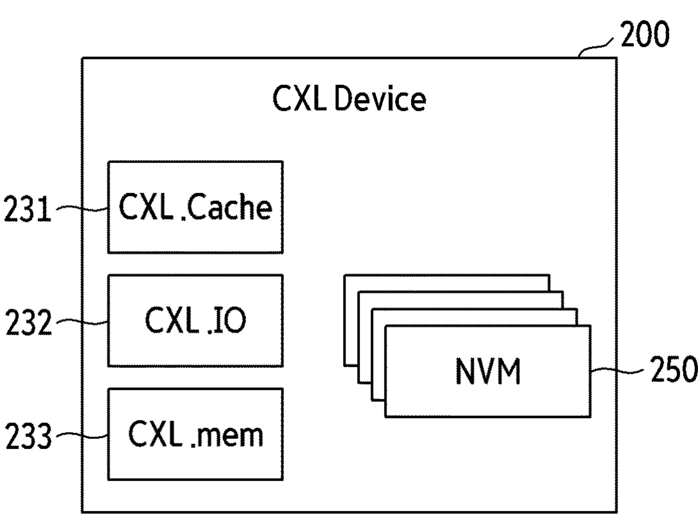
FIG. 3 is an exemplary diagram of a storage device according to an embodiment.

FIG. 2 is an exemplary diagram of a host device according to an embodiment, and FIG. 3 is an exemplary diagram of a storage device according to an embodiment.

Referring to FIG. 2, the host device 100 may include a host CXL.cache protocol 131, a device driver 135, a file system layer 140, and an application layer 150. In an embodiment, the host CXL.cache protocol 131, the device driver 135, the file system layer 140, and the application layer 150 may be implemented as hardware, software, or any combination thereof, and may be run on the host device 100.

The application layer 150 may include various application programs that are run on the host device 100. The application layer 150 generates data or accesses data stored in the storage device 200 in accordance with the running of the application program. In the application layer 150, data may be generated or accessed by byte address. For example, each byte of the data may have a unique address in memory.

The file system layer 140 may be configured to organize files or data used by the application layer 150.

In some embodiments, the file system layer 140 may have different forms depending on the operating system (OS) of the host device 100. The file system layer 140 may include at least one of various file system forms such as File Allocation Table (FAT), FAT32, NT File System (NTFS), Hierarchical File System (HFS), Journaled File System 2 (JSF2), XFS, On-Disk Structure-5 (ODS-5), UDF, ZFS, Unix File System (UFS), ext2, ext3, ext4, ReiserFS, Reiser4, ISO 9660, Gnome VFS, BFS, and WinFS.

The device driver 135 may perform operations of converting information from an address manager, the file system layer 140 or the application layer 150 into information that is recognizable by the storage device 200. The device driver 135 may be connected to the storage device 200 using the host CXL.mem protocol and the host CXL.io protocol.

According to an embodiment, the device driver 135 manages storage space of the storage device 200 as logic block addresses (LBA). According to an embodiment, the device driver 135 manages a data identifier and the logic block addresses of the storage device 200 by mapping them to byte address of the host memory 120. According to an embodiment, the data identifier is a file name or an operation time (Time). According to an embodiment, the device driver 135 manages a key used for synchronization by mapping it to a byte address used in the application layer 150.

The host CXL.cache protocol 131 according to some embodiments may apply a consistency mechanism (e.g., consistency rules) to some or all of the host memory 120 and the device memory 220. For example, the host CXL.cache protocol 131 may apply the consistency mechanism to the data identifier or the key together with the device CXL.cache protocol 230. For example, the host CXL.cache protocol 131 and the device CXL.cache protocol 230 may maintain consistency between the host 100 and the storage device 200 by implementing a host to device request, a device to host request or a response.

Referring to FIG. 3, the storage device 200 may communicate with the host device 100 by lower protocols of the CXL interface. For example, the device interface 230 supports and includes the device CXL.cache protocol 231, the device CXL.io protocol 232, and the device CXL.mem protocol 233. The device interface 230 may be connected to the device controller 210, the device memory 220, and the non-volatile memory device 250 through each of the protocols 231, 232, and 233.

For example, the CXL.cache protocol 231 is a link that allows the storage device 200 to access the host memory 120, may include caching semantics, and the device CXL.mem protocol 233 is a link that allows the host device 100 to access the device memory 100, and may include memory semantics. The caching semantics may be rules and behaviors that define how data is stored, accessed, updated, and invalidated in a cache. Memory semantics may be rules and behaviors that define how memory operations (such as reads, writes, and synchronization events) are executed in a system.

The device CXL.io protocol 232 is based on the Peripheral Component Interconnect Express (PCIe) specification, and is a link associated with device discovery, configuration, register access, interrupts, etc. Like the PCIe, the CXL interface may support (i) basic widths of divisible x16, x8, and x4, (ii) data rates of 8GT/s, 16GT/s, and 32GT/s degradable at 128*b*/130*b*, (iii) 300 W (75 W at x16 connector), and (iv) plug and play. To support plug and play, the PCIe or CXL device link may start training on a PCIe of Gen1, negotiate CXL, and start a CXL transaction after completing Gen 1-5 training.

Figure 4:
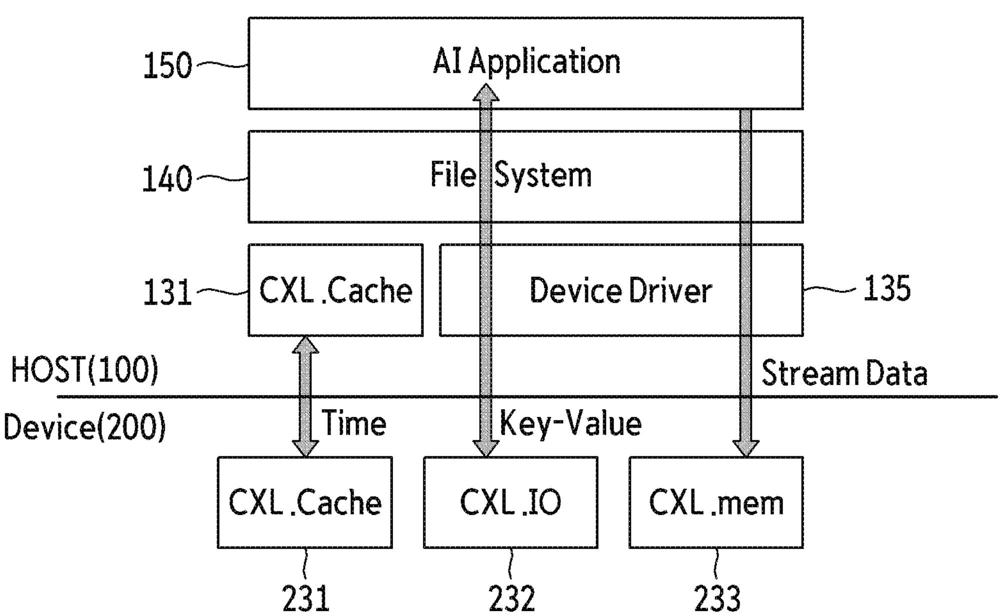
FIG. 4 is a diagram for explaining a connection relationship between a host and a storage device according to an embodiment.

FIG. 4 is a diagram for explaining a connection relationship between a host and a storage device according to an embodiment.

Referring to FIG. 4, a host 100 and a storage device 200 divide stream data into data parts and store the data parts in the host memory 120 or the device memory 220 on the basis of a key value of one or more keys, while synchronizing the keys of the stream data through the CXL.cache protocol in accordance with the consistency mechanism of the CXL interface.

The host 100 checks and stores the key value based on a transaction point, while transmitting the stream data generated by an application 150. The transaction point may refer to a specific memory transaction between the host 100 and the storage device 200. The transaction point may represent the moment when a memory operation (e.g., a read, write) occurs. The key value may be a unique identifier or piece of metadata that helps identify and track the memory transaction, or may be used to handle coherence and ownership of a specific memory block for ensuring that the data of the memory transaction remains consistent across multiple devices that might share or access the data.

The storage device 200 receives the stream data through the device CXL.mem protocol 233 and transmits it to the device memory 220. The device CXL.mem protocol 233 sets the key value on the basis of the transaction point between the host and the storage device, and stores it as meta information of the stream data.

The device memory 220 maps and stores the key value used to synchronize the stream data received through the device CXL.cache protocol 231. The device memory 220 checks a logic block address of a location at which the stream data is stored, and stores the stream data. The stream data may be stored in the device memory 220 in the order of the key value. For example, if the stream data includes several frames of video data, each frame could have a unique key value, and the frames would be presented in the order of their key values, corresponding to the time each frame is to be displayed. The stream data is time-series data, and may be divided according to the transaction point. That is, the key used for synchronization is, for example, an attribute based on the operation time. The host CXL.cache protocol and the device CXL.cache protocol may use the time of the transaction point of the stream data between the host and the device, as the key value. For example, the timestamp at the exact moment a memory transaction occurs between the host 100 and the device memory 200 may be included in the key value.

According to some embodiments, when there are a plurality of storage devices 200, the host CXL.cache protocol and the device CXL.cache protocol may include a storage device-specific unique ID in the key value. According to some embodiments, when a plurality of host devices 100 are connected to at least one storage device 200, a host-specific ID and a storage device-specific ID may be included in the key value. The device CXL.io protocol may manage the host-specific ID, the device-specific ID, the key value, and the like.

Thereafter, at the time of a data access, the host 100 transmits a data access request including the key value of the previously transmitted stream data, and the device 200 may access the device memory of the logic block address corresponding to the key value, read the stream data corresponding to the key value, and transmit it to the host 100.

Figure 5:
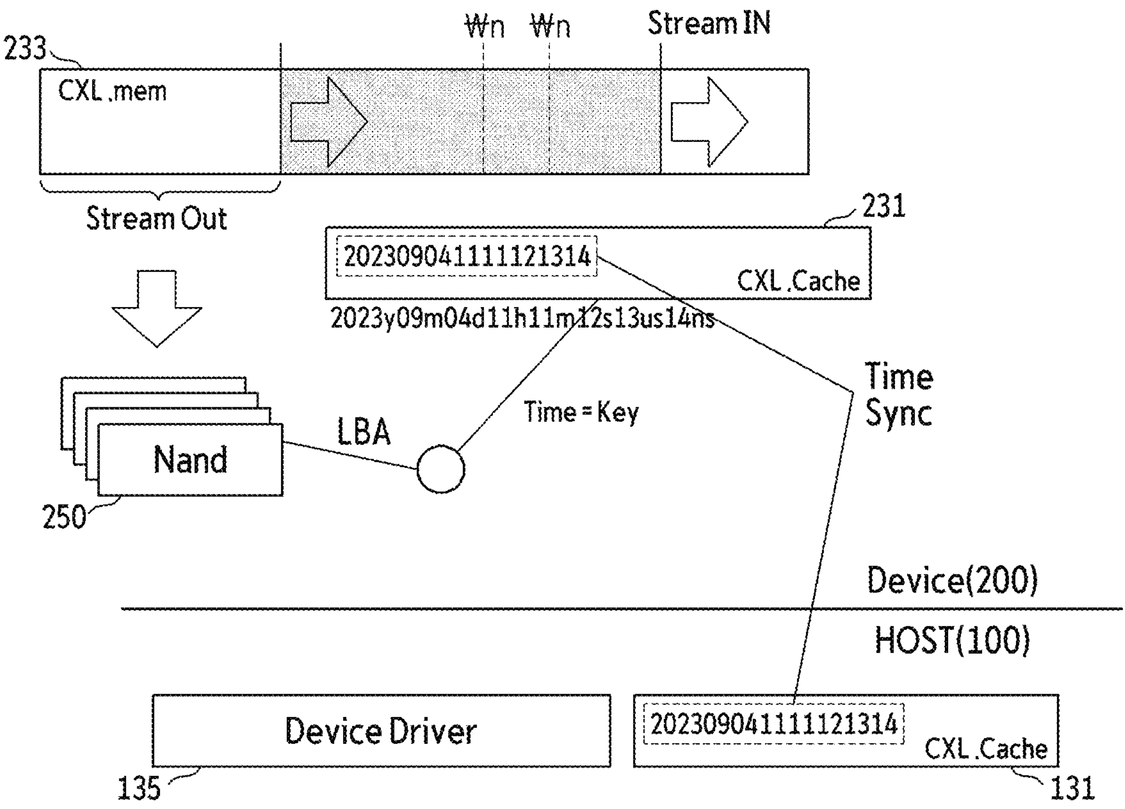
FIG. 5 is a diagram for explaining an operation of the storage system of FIG. 4 according to an embodiment.

FIG. 5 is a diagram for explaining the operation of the storage system of FIG. 4 according to an embodiment.

Referring to FIG. 5, according to some embodiments, the device CXL.cache protocol 231 and the host CXL.cache protocol 131 perform operations according to a consistency mechanism. The host CXL.cache protocol 131 synchronizes the device CXL.cache protocol 231 and the key.

The key is an attribute associated with data, which is time-series data in the case of stream data, and the operation time (Time) may be an embodiment of the key. In the shown example, the attribute of the key is the operation time, and the key value may be a value mapped to the time of the transaction point of the stream data between the host and the device. According to some embodiments, when there are a plurality of storage devices 200, the host 100 and the device 200 may include a unique ID specific to the storage device 200 in the key value. Alternatively, according to some embodiments, the key value may be defined as a value of another element that has an independent and unique value for transactions between the host and the storage device according to various embodiments.

The storage device 200 stores the stream data in the device memory 220 in the order of being received by the host 100 through the CXL.mem protocol 233 (i.e., in the order from Stream In to Stream Out). The device CXL.mem protocol 233 may store the received data by mapping it to a set key value after checking the transaction point in the device CXL.cache protocol 231. When the stream data is transmitted at 11:11, 12 s 13 μs and 14 ns on Sep. 4, 2023, the device CXL.mem protocol 233 sets the transmission point as the key value of the stream data (202309041111121314 in the example), and the device CXL.mem protocol 233 maps the stream data to the set key value (202309041111121314) and stores it in the device memory 220.

The storage device 200 stores the received stream data in the non-volatile memory device 250 via the device memory 220. The storage device 200 maps the logic block address (LBA) of the non-volatile memory device 250, in which the stream data is stored, to the set key value (2023090411111121314 in the example).

Figure 6:
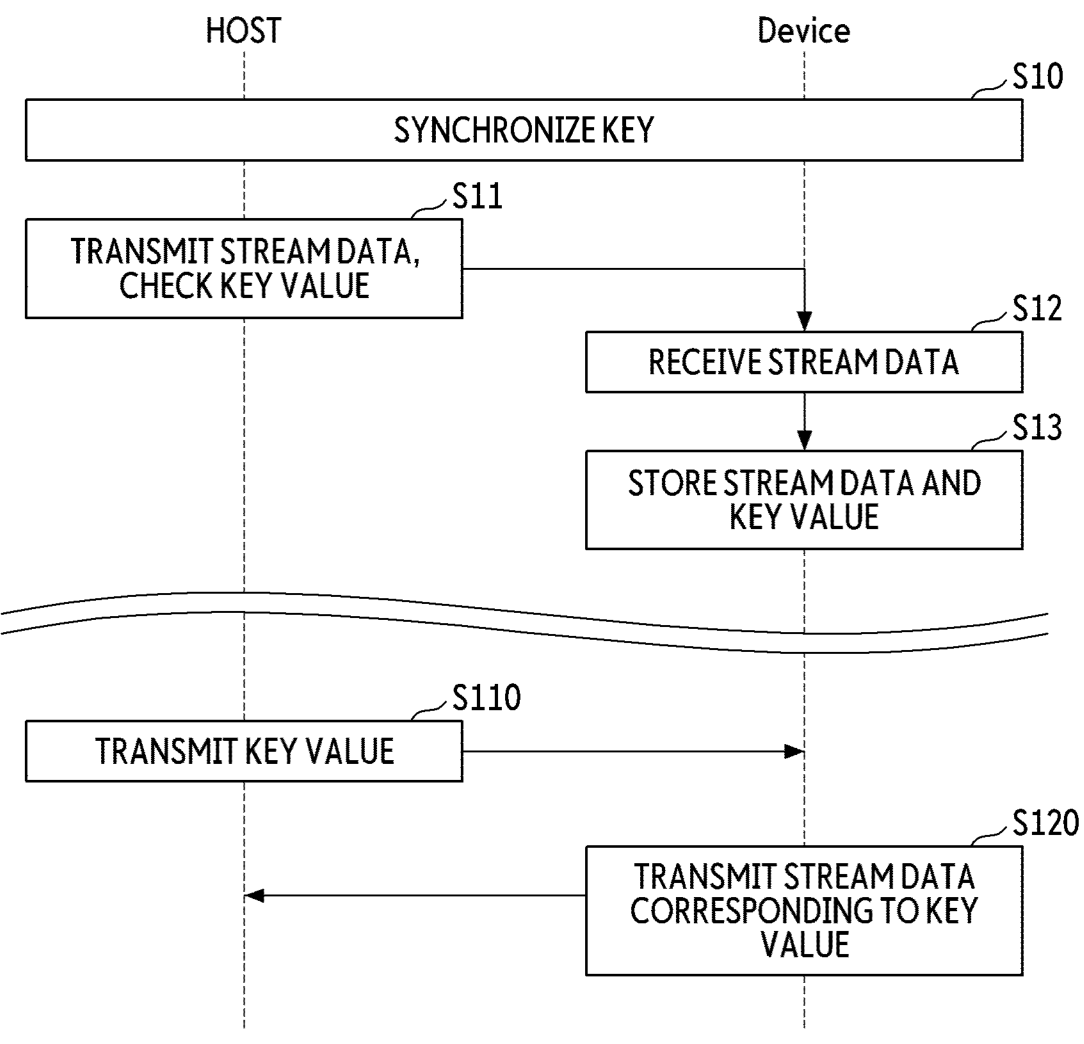
FIG. 6 is a flow chart for explaining a method of operating the storage system of FIG. 4 according to an embodiment.

FIG. 6 is a flow chart for explaining a method of operating the storage system of FIG. 4 according to an embodiment.

Referring to FIG. 6, the host CXL.cache protocol and the device CXL.cache protocol perform a synchronization operation for maintaining consistency between the host memory and the device memory (S10). The synchronization operation may be performed on the host 100 and the storage device 200 using the key. The key may be, for example, an attribute mapped to an operation time between the host 100 and the storage device 200.

When the host 100 transmits the stream data (S11), the storage device 200 receives the stream data through the device CXL.mem protocol 233 (S12). The storage device 200 receives the data, and the device CXL.mem protocol 233 may divide the stream data on the basis of the key value.

The storage device 200 may store the stream data. For example, the stream data may be stored in the device memory 220. As an example, the stream data may be received by the device memory 220, and then transmitted to and stored in the non-volatile memory device 250 (S13). The storage device 200, for example the device CXL.mem protocol 233, may store the key value by mapping the key value to the stream data and logic block address (LBA).

The host 100 checks the key value, which is based on the transaction point of the stream data, maps the checked key value to the corresponding stream data information, and stores this mapping in the device driver 135. Thereafter, when it is required to access the stream data during an operation, the host 100 may request the storage device 200 for the stream data access. For example, the host 100 may transmit an access request including a key value corresponding to the stream data through the device driver 135 (S110). The storage device 200 checks the key value included in the access request, and may transmit the stream data corresponding to the checked key value (S120). For example, the stream data may be transmitted to the host 100 through the device CXL.mem protocol 233.

Because the host 100 may utilize the storage device 200 as a storage means of stream data having time series characteristics by the storage system according to the above embodiment, and the stream data of the storage device may be accessed simply by using a key value through the CXL interface, faster data processing and more efficient memory access may be possible.

Figure 7:
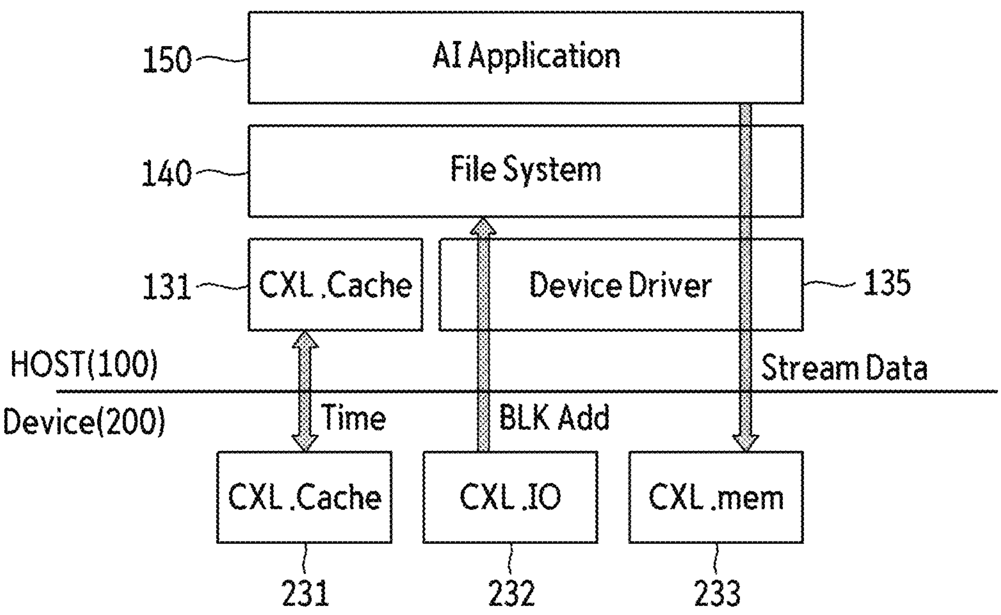
FIG. 7 is a diagram for explaining a connection relationship between a host and a storage device according to an embodiment.

FIG. 7 is a diagram for explaining a connection relationship between a host and a storage device according to an embodiment.

Referring to FIG. 7, the host 100 and the storage device 200 divide the stream data into data parts, and store the data parts of the stream data in the host memory 120 or the device memory 220 on the basis of a data identifier, while synchronizing the data identifier according to the consistency mechanism of the CXL interface.

When the host 100 transmits stream data generated by the application 150, the storage device 200 may set a logic block address (LBA) corresponding to the stream data through the device CXL.mem protocol 233, and send the set logic block address and data identifier to the host 100 through the device CXL.io protocol 232.

The data identifier is an operation time (Time) between the host and the device according to an embodiment. Alternatively, the data identifier may be a file name of the data between the host and the device according to some embodiments.

The application layer 150 may transmit the stream data to the device CXL.mem protocol 233 to enable the storage device 200 to receive the stream data. The stream data generated by the application layer 150 is time-series data, may be stored in the host memory 120, and may be stored in the order of byte addresses in the host memory 120. For example, the stream data may be divided into bytes each corresponding to one of the byte addresses.

The device memory 220 stores the stream data by mapping the stream data to the data identifier used for synchronization through the device CXL.cache protocol 231. The stream data may be stored, for example, in the device memory 220. The stream data may be stored, for example, in the device memory 220, and then transmitted to and stored in the non-volatile memory device 250.

The device CXL.io protocol 232 is a protocol used for searching, connection, setting, and management between the host 100 and the storage device 200, and transmits, for example, a data identifier and a logic block address of stream data to the host 100. The host 100 maps and stores a byte address corresponding to the data identifier of the stream data and a logic block address (BLK Add) in the device driver 135. The logic block address (BLK Add) may correspond to a block of memory include several bytes.

Figure 8:
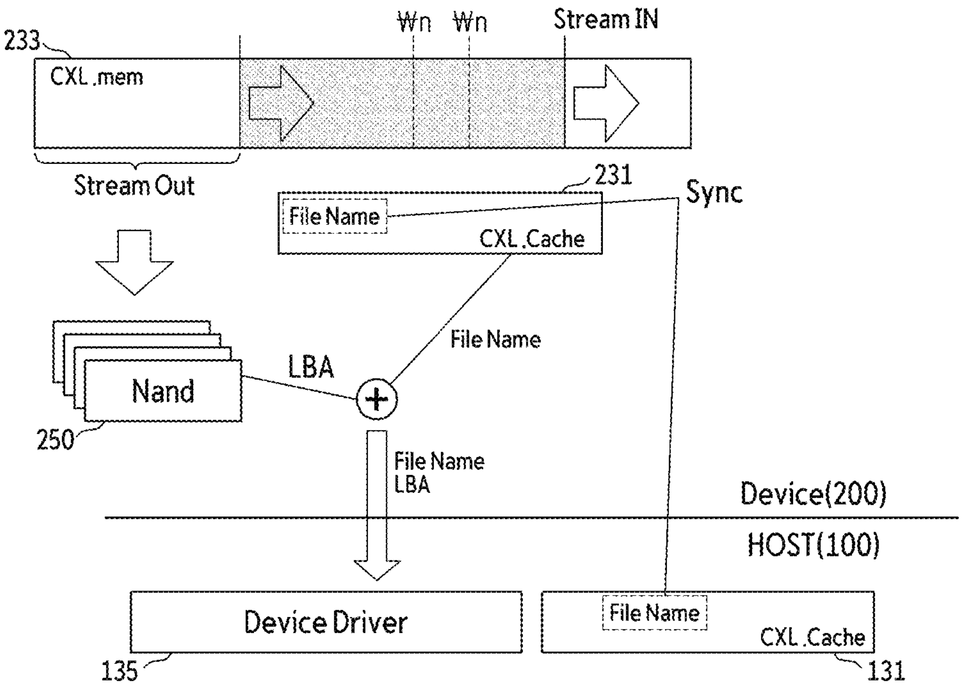
FIG. 8 is a diagram for explaining the operation of the storage system of FIG. 7 according to an embodiment.

FIG. 8 is a diagram for explaining the operation of the storage system of FIG. 7 according to an embodiment.

Referring to FIG. 8, according to some embodiments, the device CXL.cache protocol 231 and the host CXL.cache protocol 131 perform an operation of synchronizing the data identifier according to a consistency mechanism. For example, the data identifier is a file name, and the host CXL.cache protocol 131 synchronizes the file names of data stored in the host memory and the device memory through the device CXL.cache protocol 231 so that the file names are the same.

According to some embodiments, when the host 100 transmits stream data to the storage device 200, the storage device 200 receives the stream data through the CXL.mem protocol 233. The CXL.mem protocol of the storage device 200 stores the stream data in the device memory 220 or the non-volatile memory device 250 in the order received from the host 100.

The storage device 200 maps the received stream data to a file name used to synchronization and stores this mapping, while storing the received stream data in the device memory 220 or the non-volatile memory device 250. For example, the device CXL.io protocol 232 maps the logic block address (LBA) of the non-volatile memory device, in which the stream data is stored, to the file name. The device CXL.io protocol 232 transmits the mapping information of the file name and the logic block address (Filename, LBA) to the device driver 135 of the host.

The host 100 maps the logic block address (Filename, LBA) corresponding to the file name used for synchronization to a byte address and stores this mapping in the device driver 135. For example, the host 100 may store the mapping information in the device driver 135.

Figure 9:
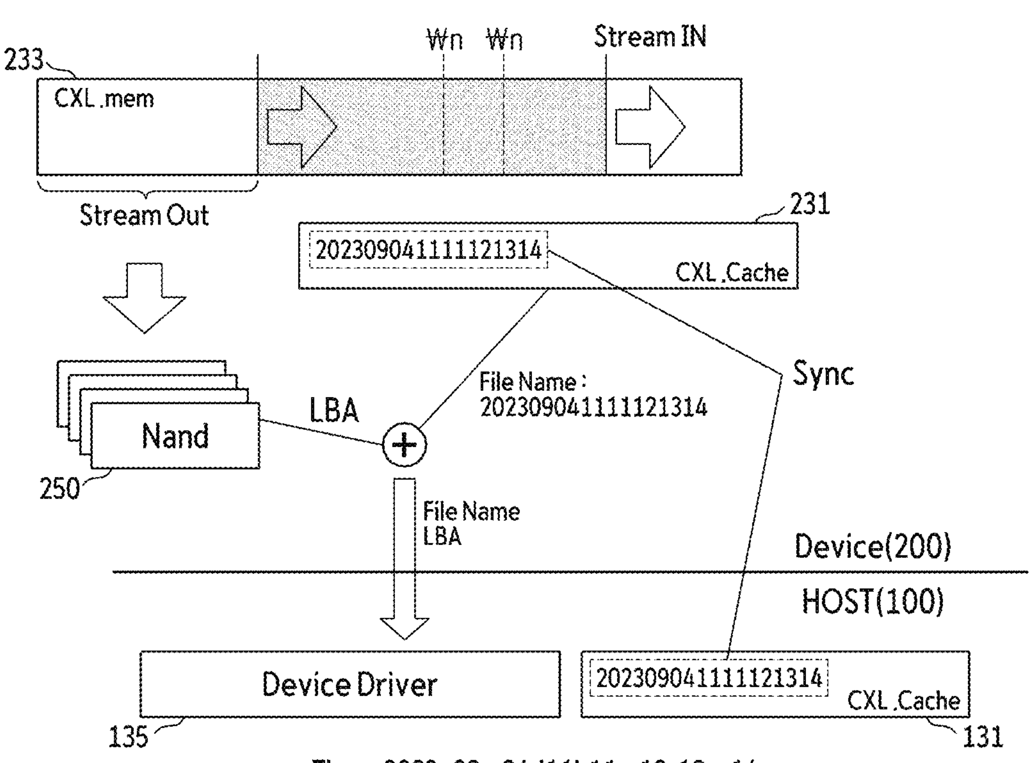
FIG. 9 is a diagram for explaining the operation of the storage system of FIG. 7 according to some embodiments.

FIG. 9 is a diagram for explaining the operation of the storage system of FIG. 7 according to an embodiment.

Referring to FIG. 9, according to some embodiments, the device CXL.cache protocol 231 and the host CXL.cache protocol 131 perform an operation of synchronizing the data identifier according to the consistency mechanism. For example, the data identifier is a transaction point, and the host CXL.cache protocol 131 first synchronizes the data identifier so that the operation time (e.g., the reference time of the operation) is the same as that of the device CXL.cache protocol 231.

The CXL.mem protocol of the storage device 200 stores the stream data in the device memory 220 or the non-volatile memory device 250 in the order received by the host 100. In the shown example, when the stream data is transmitted at 11:11 12 s 13 μs 14 ns on Sep. 4, 2023, the device CXL.mem protocol 233 checks the transaction point at which the transaction occurs on the basis of the operation time set by the device CXL.cache protocol 231, and sets it as the file name (20230904111121314 in the example) of the stream data and stores it in the device memory 220.

The storage device 200 stores the received stream data in the non-volatile memory device 250 via the device memory 220, and the device CXL.io protocol 232 maps the logic block address (LBA) of the non-volatile memory device, in which the stream data is stored, to a file name based on the transaction point. The device CXL.io protocol 232 transmits the mapping information of the file name (20230904111121314 in the example) and the logic block address (Filename, LBA) of the transmission point to the device driver 135 of the host.

The host 100 maps the mapping information of the file name (202309041111121314 in the example) and the logic block address (Filename, LBA) received through the device driver 135 to a byte address, and stores it in the file system layer 140. For example, the host 100 stores a mapping of the mapping information to the byte address in the file system layer 140.

Figure 10:
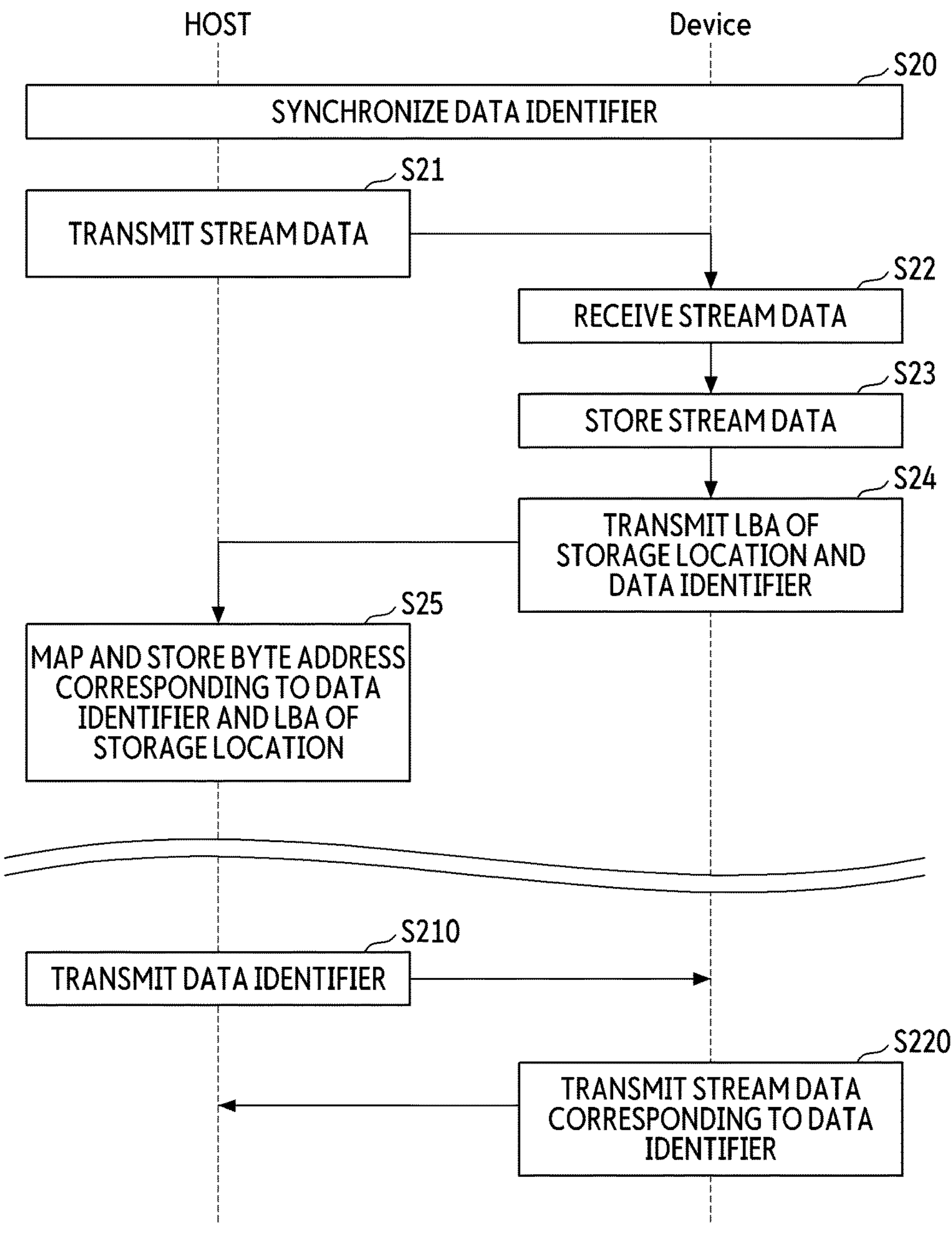
FIG. 10 is a flowchart for explaining a method of operation of the storage system of FIG. 7 according to an embodiment.

FIG. 10 is a flowchart for explaining a method of operation of the storage system of FIG. 7 according to an embodiment.

Referring to FIG. 10, the host CXL.cache protocol and the device CXL.cache protocol perform a synchronization operation for maintaining the consistency between the host memory and the device memory (S20). The synchronization operation may be performed on the host 100 and the storage device 200 using a data identifier for dividing the stream data transmitted by the host 100 to the storage device 200. The data identifier is an element determined on the basis of an attribute of the data. For example, when the stream data is data having a time series characteristic, the data identifier may be an element based on the time attribute. For example, when the data identifier of the stream data is the operation time, the data identifier may synchronize the time between the host 100 and the storage device 200. Alternatively, for example, the file name of the data stored in the host 100 may be synchronized with the file name of the data stored in the storage device 200 according to the consistency mechanism of the CXL interface.

When the host 100 transmits the stream data (S21), the storage device 200 receives the stream data through the device CXL.mem protocol (S22).

The storage device 200 receives the stream data sequentially, and the device CXL.mem protocol may divide the stream data on the basis of the data identifier. For example, the device CXL.mem protocol 233 may set the file name of the stream data to the data identifier. For example, the device CXL.mem protocol may synchronize the file name set by the host with the file name of the stream data to be received and stored by the device. Alternatively, for example, the device CXL.mem protocol may set the transaction point at which the host transmits the stream data, as the file name of the stream data.

The storage device 200 may receive the stream data by the device memory 220, and then transmit it to the non-volatile memory device 250 and store the stream data therein (S23).

The storage device 200 transmits a storage location address of the stream data stored in the non-volatile memory device 250 or the device memory 220, i.e., the logic block address, to the host, together with the data identifier used for synchronization (S24).

The host 100 maps a byte address corresponding to the data identifier used for synchronization to the received logic block address and stores it in the device driver 135 (S25). For example, mapping information that maps the byte address to the data identifier may be stored in the device driver 135.

Thereafter, when there is a need to access the stream data during operation, the host 100 may request the storage device 200 for the stream data access. For example, the host 100 may transmit an access request including a data identifier corresponding to the stream data through the device driver 135 (S210). The storage device 200 checks the data identifier included in the access request, and transmits the stream data corresponding to the confirmed data identifier (S220). For example, the stream data may be transmitted to the host 100 through the device CXL.mem protocol 233.

Figure 11:
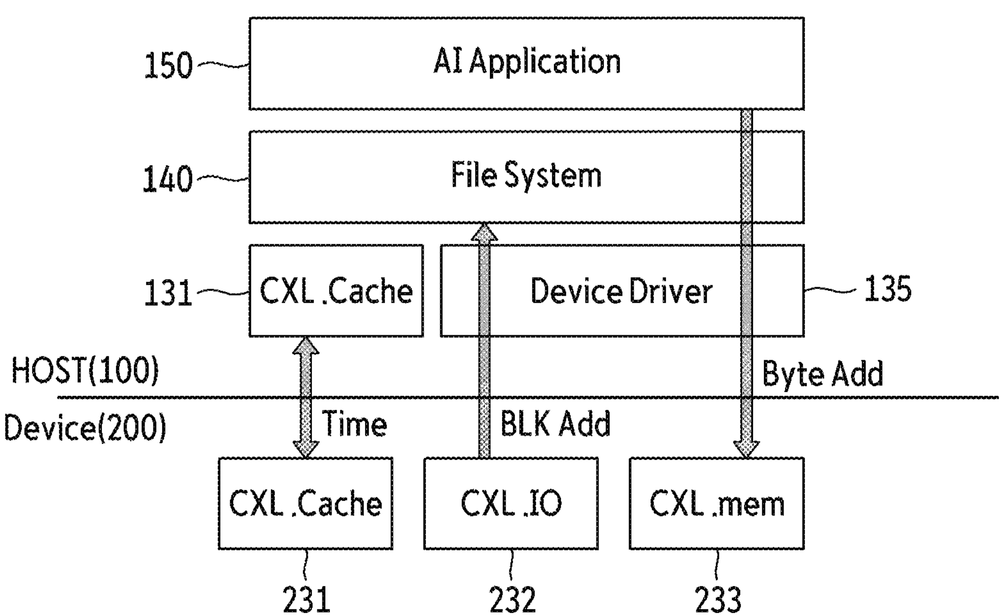
FIG. 11 is a diagram for explaining a connection relationship between a host and a storage device according to an embodiment.

FIG. 11 is a diagram for explaining a connection relationship between a host and a storage device according to an embodiment.

Referring to FIG. 11, the host 100 and the storage device 200 divide the stream data, and divide and store the stream data in the host memory 120 or the device memory 220 on the basis of a data identifier, while synchronizing the data identifier according to the consistency mechanism of the CXL interface.

When the host 100 transmits the stream data and byte address generated by the application 150, the storage device 200 may set the logic block address corresponding to the stream data through the device CXL.mem protocol 233, and set the set logic block address and data identifier to the host 100 through the device CXL.io protocol 232.

The data identifier may be the operation time (Time) between the host and the device according to some embodiments. Alternatively, the data identifier may be the file name of the data between the host and the device according to some embodiments.

The application layer 150 transmits the stream data and its byte address to the device CXL.mem protocol 233, and the storage device 200 receives the stream data mapped to the byte address. The device memory 220 stores the stream data by mapping the stream data to the data identifier used for synchronization through the device CXL.cache protocol 231. The stream data may be stored in the device memory 220 in byte address order.

The device CXL.io protocol 232 may be a protocol used for searching, connection, setting, and management between the host 100 and the storage device 200, and may transmit, for example, a data identifier and a logic block address of the stream data to the host 100. The host 100 maps and stores a byte address and a logic block address (BLK Add) corresponding to the data identifier in the file system layer 140.

Figure 12:
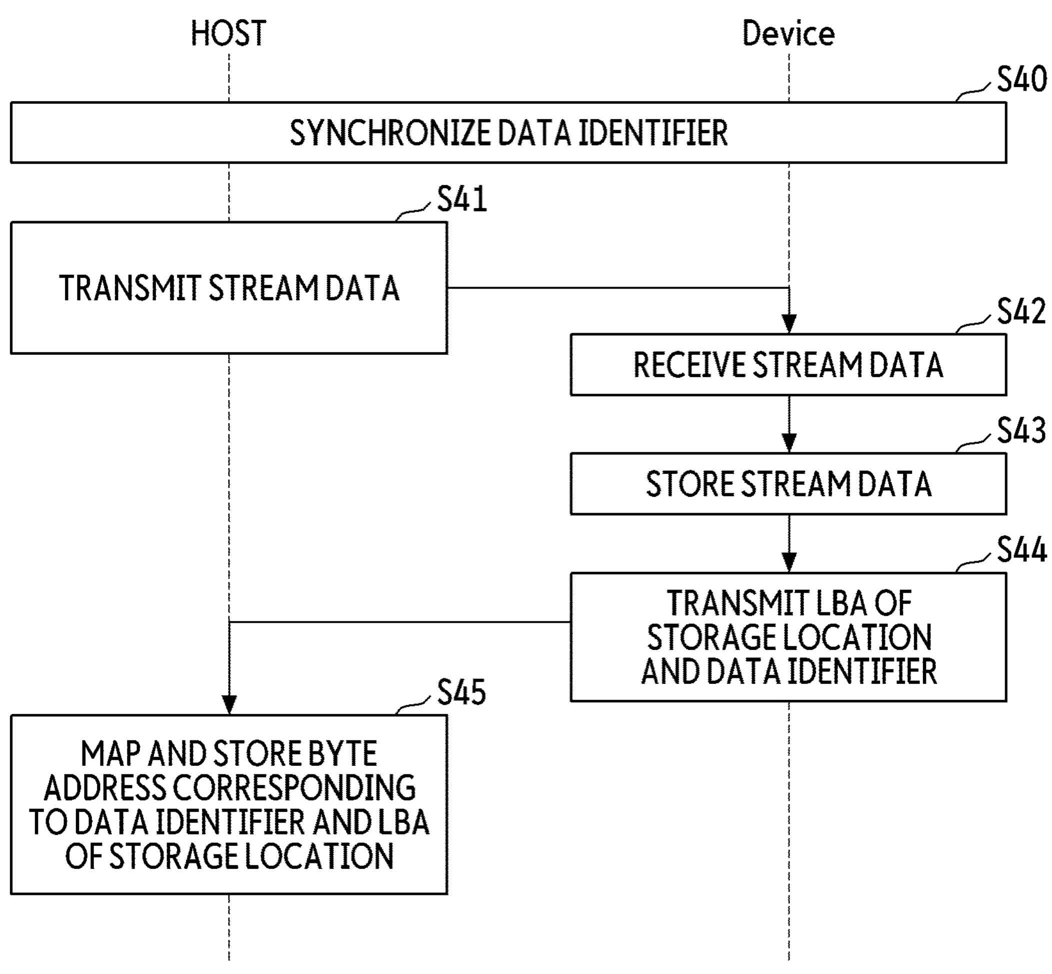
FIG. 12 is a flow chart for explaining a method of operating the storage system of FIG. 11 according to an embodiment.

FIG. 12 is a flow chart for explaining a method of operating the storage system of FIG. 11 according to an embodiment.

Referring to FIG. 12, the host CXL.cache protocol and the device CXL.cache protocol perform a synchronization operation for maintaining consistency between the host memory and the device memory (S40). The synchronization operation may be performed on the host and the memory using a data identifier for dividing the stream data transmitted to the storage device 200 from the host 100. For example, the time between the host 100 and the storage device 200 may be synchronized. Or, for example, the data between the host 100 and the storage device 200 may be synchronized. For example, the file name of the data stored in the host 100 may be synchronized with the file name of the data stored in the storage device 200.

When the host 100 transmits stream data together with the byte address (S41), the storage device 200 receives the stream data of the byte address through the device CXL.mem protocol (S42). The storage device 200 receives the data in time sequence, and the device CXL.mem protocol may divide the stream data on the basis of the data identifier. For example, the device CXL.mem protocol may set the file name of the stream data as the data identifier. For example, the device CXL.mem protocol may set the time at which the host transmits the stream data, as the file name of the stream data. Alternatively, for example, the device CXL.mem protocol may synchronize the file name set by the host with the file name of the stream data to be received and stored by the device.

The storage device 200 receives the stream data transmitted by the device memory 220, and then may transmit it to the non-volatile memory device 250 and store the stream data therein (S43).

The storage device 200 transmits the storage location address (e.g., logical block address) of the stream data stored in the non-volatile memory device 250 or the device memory 220, to the host, together with the data identifier used for synchronization (S44).

Meanwhile, the host 100 maps the byte address corresponding to the data identifier used for synchronization to the received logic block address, and stores it in the file system 140 (S45). For example, mapping information mapping the byte address to the logical block address may be stored in the file system 140.

Thereafter, when there is a need to access the stream data during an operation, the host 100 may request the storage device 200 for the stream data access. For example, the host 100 may transmit an access request including a data identifier corresponding to the stream data through the device driver 135. The storage device 200 may transmit the stream data of a logic block address (BLK Add) corresponding to the synchronous data identifier. For example, the stream data may be transmitted to the host 100 through the device CXL.mem protocol 233.

The host 100 may utilize the storage device 200 as a storage means of the stream data having time series characteristics by the storage system according to the above embodiment, and the stream data of the storage devices may be easily stored and accessed, using the data identifier without the transaction operation of address translation through the CXL interface. Accordingly, faster data processing and more efficient memory access can be possible.

Although various embodiments of the present invention have been described above with reference to the accompanying drawings, the present invention is not limited to the above embodiments, and may be implemented in various different forms. Those skilled in the art will appreciate that the present invention may be embodied in other specific forms without changing the technical spirit of the present invention. Accordingly, the above-described embodiments should be understood in all respects as illustrative and not restrictive.

What is claimed is:

1. A storage system comprising:

a host; and a storage device including a device memory, wherein the host and the storage device communicate with one another through a Compute Express Link (CXL) interface, wherein, in response to the storage device receiving an access request including a key value of a key from the host, the storage device reads stream data from the device memory and transmits the stream data to the host based on the key value synchronized between the host and the storage device according to a consistency mechanism of the CXL interface.

2. The storage system of claim 1, wherein the host comprises:

a host CXL.cache protocol which performs a synchronization operation on the storage device using the key;

an application layer which generates the stream data;

a host memory which stores the stream data; and a device driver which stores a mapping of the key value to a byte address of the host memory.

3. The storage system of claim 1, wherein the storage device comprises:

a device CXL.cache protocol which synchronizes the key, and checks the key value based on a transaction point of the stream data; and a device CXL.mem protocol which receives the stream data from the host, wherein the device memory maps the key value and stores the stream data.

4. The storage system of claim 1, wherein the key value further comprises a unique identifier (ID) specific to the host.

5. The storage system of claim 4, wherein the key value further comprises a unique ID specific to the storage device.

6. The storage system of claim 1, wherein the key value is based on a transaction point of the stream data between the host and the storage device.

7. A storage system comprising:

a storage device comprising a Compute Express Link (CXL) interface and a device memory that stores stream data; and a host connected to the CXL interface and configured to generate an access request including a data identifier, wherein the storage device reads the stream data from the device memory at a logic block address corresponding to the data identifier, and transmits the stream data to the host, and wherein the data identifier included in the access request is synchronized between the host and the storage device according to a consistency mechanism of the CXL interface.

8. The storage system of claim 7, wherein the storage device comprises:

a device CXL.cache protocol which synchronizes the host with the storage device using the data identifier; and a device CXL.mem protocol which receives the stream data generated by the host, wherein the device memory stores the stream data mapped to the data identifier used for synchronization.

9. The storage system of claim 8, wherein the storage device sets the data identifier of the stream data as a file name.

10. The storage system of claim 9, wherein the storage device sets the file name of the stream data as a transaction point of the stream data.

11. The storage system of claim 8, wherein the storage device further comprises a device CXL.io protocol that outputs the data identifier and a logic block address to the host, wherein the logic block address is a location, at which the stream data corresponding to the data identifier is stored.

12. The storage system of claim 11, wherein the host comprises a device driver that stores the logic block address received together with the data identifier by mapping a byte address corresponding to the data identifier to the logic block address.

13. The storage system of claim 12, wherein the host further comprises:

a host CXL.cache protocol that synchronizes the data identifier;

an application layer that generates the stream data; and a host memory that stores the stream data in the byte address, wherein the host transmits the data identifier and the stream data through the device driver.

14. A storage device comprising:

a device CXL.mem protocol which receives stream data from a host;

a device CXL.cache protocol which synchronizes the host with a key associated with the stream data in accordance with a consistency mechanism, and checks a key value of the key; and a device memory which stores the stream data together with the key value, wherein the storage device is configured to read and transmit the stream data to the host based on the key value synchronized between the host and the storage device.

15. The storage device of claim 14, wherein the host comprises:

a host CXL.cache protocol which synchronizes the storage device with the key, and checks the key value when transmitting the stream data; and a device driver which stores the checked key value as mapping information of the stream data.

16. The storage device of claim 15, wherein the host transmits an access request including the key value to the storage device.

17. The storage device of claim 14, wherein the key value is a value based on a transaction time of the stream data between the host and the storage device.

18. The storage device of claim 14, wherein the key value further comprises a unique identifier (ID) of the host.

19. The storage device of claim 18, wherein the key value further comprises a unique ID of the storage device.

20. The storage device of claim 14, wherein the storage device stores the stream data in an order of the key value.

* * * * *